United States Patent
Paik et al.

(10) Patent No.: US 9,826,162 B2
(45) Date of Patent: Nov. 21, 2017

(54) METHOD AND APPARATUS FOR RESTORING MOTION BLURRED IMAGE

(71) Applicant: CHUNG-ANG UNIVERSITY INDUSTRY-ACADEMIC COOPERATION FOUNDATION, Seoul (KR)

(72) Inventors: Joon Ki Paik, Seoul (KR); Eun Sung Lee, Seoul (KR); Eun Jung Chae, Seoul (KR); He Jin Cheong, Seoul (KR)

(73) Assignee: CHUNG-ANG UNIVERSITY INDUSTRY-ACADEMIC COOPERATION FOUNDATION, Seoul (KR)

( * ) Notice: Subject to any disclaimer, the term of this patent is extended or adjusted under 35 U.S.C. 154(b) by 0 days.

(21) Appl. No.: 15/029,618

(22) PCT Filed: Mar. 14, 2016

(86) PCT No.: PCT/KR2016/002513
§ 371 (c)(1),
(2) Date: Apr. 14, 2016

(87) PCT Pub. No.: WO2016/204382
PCT Pub. Date: Dec. 22, 2016

(65) Prior Publication Data
US 2017/0104933 A1    Apr. 13, 2017

(30) Foreign Application Priority Data
Jun. 16, 2015   (KR) .................. 10-2015-0085274

(51) Int. Cl.
H04N 5/228    (2006.01)
H04N 5/232    (2006.01)

(52) U.S. Cl.
CPC ..... H04N 5/23264 (2013.01); H04N 5/23258 (2013.01)

(58) Field of Classification Search
CPC ........... H04N 5/23248; H04N 5/23251; H04N 5/23264; H04N 5/144–5/145; H04N 5/357; G03B 2217/005
(Continued)

(56) References Cited

U.S. PATENT DOCUMENTS

2006/0291841 A1* 12/2006 Fukumoto ............... G03B 5/00
                                                                 396/55
2010/0246989 A1*  9/2010 Agrawal ................. G06T 5/003
                                                                 382/255
(Continued)

FOREIGN PATENT DOCUMENTS

JP          5596138 B     8/2014
KR      20090027493 A     3/2009
(Continued)

OTHER PUBLICATIONS

Korean Office Action dated Oct. 16, 2015 in connection with the counterpart Korean Patent Application No. 10-2015-0085274.
(Continued)

*Primary Examiner* — Kelly L Jerabek
(74) *Attorney, Agent, or Firm* — Hauptman Ham, LLP

(57) ABSTRACT

A method and an apparatus for restoring a motion blurred image are disclosed. The method of restoring a motion blurred image comprises calculating a motion trajectory and a project trajectory of a camera using an embedded sensor; estimating a point spread function according to camera motion by using the motion trajectory and the project trajectory; and restoring the motion blurred image using the estimated point spread function and a spatially variant activity map.

5 Claims, 4 Drawing Sheets

(58) Field of Classification Search
USPC .......... 348/208.99, 208.1–208.4, 222.1, 241
See application file for complete search history.

(56) References Cited

U.S. PATENT DOCUMENTS

| | | | | |
|---|---|---|---|---|
| 2011/0109755 A1* | 5/2011 | Joshi | ................ | H04N 5/23248 348/208.5 |
| 2012/0033094 A1* | 2/2012 | Ishii | ................... | G02B 27/646 348/208.6 |
| 2013/0101177 A1* | 4/2013 | Yamada | ............... | G06T 7/2006 382/107 |
| 2013/0107063 A1* | 5/2013 | Yano | ....................... | G03B 5/00 348/208.1 |
| 2015/0195461 A1* | 7/2015 | Kang | ................ | H04N 5/23287 348/208.2 |
| 2016/0112639 A1* | 4/2016 | Rasmusson | ....... | H04N 5/23248 348/208.6 |

FOREIGN PATENT DOCUMENTS

| | | |
|---|---|---|
| KR | 1020100079658 A | 10/2010 |
| KR | 101181161 B1 | 9/2012 |

OTHER PUBLICATIONS

Notice of Allowance dated Feb. 5, 2016 in connection with the counterpart Korean Patent Application No. 10-2015-0085274.

\* cited by examiner

METHOD AND APPARATUS FOR RESTORING MOTION BLURRED IMAGE

CROSS REFERENCE TO RELATED APPLICATION

This application claims the priority of Korean Patent Application No. 10-2015-0085274, filed on Jun. 16, 2015 in the KIPO (Korean Intellectual Property Office). Further, this application is the National Phase Application of International Application No. PCT/KR2016/002513 filed Mar. 14, 2016, which designates the United States and was published in Korean. Both of the priority documents are hereby incorporated by reference in their entireties.

TECHNICAL FIELD

The present disclosure relates to a method and an apparatus for restoring a motion blurred image.

BACKGROUND ART

A CCD image sensor or a CMOS image sensor included in a digital camera or a camera phone can read-out electric charge collected by a photoelectric device with constant velocity during an exposure time.

Here, the CCD image sensor or the CMOS image sensor employed in general popular digital camera or camera phone may have small size. Accordingly, in the event that photographing is performed in a room or at night having comparative small amount of lighting, the velocity of the read-out may become slower. In this case, the image sensor increases the exposure time to obtain adequate electric charge, and thus it is sensitive to motion such as hand-shake or moving of an object.

Additionally, since focal length becomes longer or view angle becomes narrower when a zoom function of the camera is used, great motion may be shown on output of an image though small shakiness occurs.

A motion blur may occur to the image by the motion. In the event of reducing arbitrarily the exposure time of the camera to remove the motion blur, the motion blur is reduced but much noise occurs to the image and brightness gets dark.

A conventional method of restoring a motion blurred image estimates a point spread function and restores using the estimated result. A method of minimizing repetitive error and a method of comparing and analyzing images, etc. have been used so as to restore the motion blurred image.

However, the problem exists in that the conventional methods require much repetition and calculation amount or several images taken at different view angles.

SUMMARY

To solve problem of the convention technique, the invention is to provide a method and an apparatus for restoring a high-speed motion blurred image for minimizing occurrence of artifact.

In one embodiment, the present invention is to provide a method of restoring a motion blurred image, the method comprising: calculating a motion trajectory and a project trajectory of a camera using an embedded sensor; estimating a point spread function according to camera motion by using the motion trajectory and the project trajectory; and restoring the motion blurred image using the estimated point spread function and a spatially variant activity map.

Data sensed by the embedded sensor is a gyro data for estimating angular velocity according to shaking of the camera, and the project trajectory follows a Gaussian distribution.

The point spread function is defined as accumulation of trajectory reweighted by using the Gaussian distribution.

The spatially variant activity map is used for removing ringing artifact while an edge is maintained in the motion blurred image.

In another embodiment, an apparatus for restoring a motion blurred image comprising: a processor; and a memory connected to the processor. Here, the memory stores program instructions executable by the processor, to calculate a motion trajectory and a project trajectory of a camera using an embedded sensor, estimate a point spread function according to camera motion by using the motion trajectory and the project trajectory, and restore the motion blurred image using the estimated point spread function and a spatially variant activity map.

A method and an apparatus of the invention estimate a point spread function of an image using an embedded sensor and probabilistic distribution, thereby estimating rapidly the point spread function from a single image and minimizing occurrence of artifact through a spatially variant image restoring method.

BRIEF DESCRIPTION OF DRAWINGS

Example embodiments of the present invention will become more apparent by describing in detail example embodiments of the present invention with reference to the accompanying drawings, in which.

DETAILED DESCRIPTION

Figure 1:
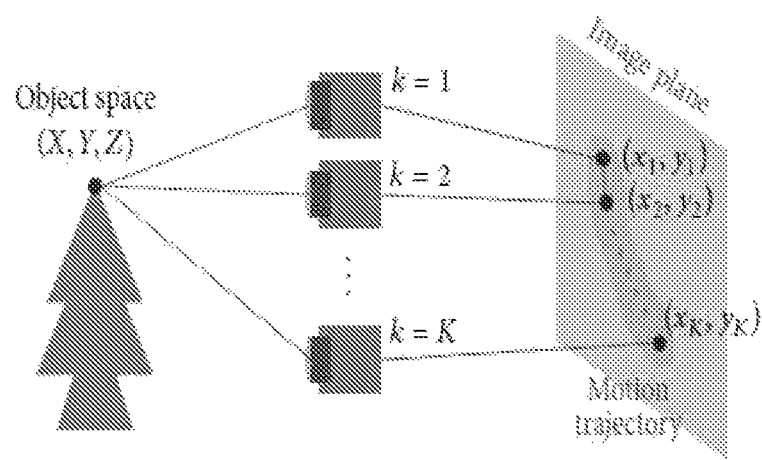
FIG. 1 is a view illustrating a general motion trajectory generation process.

The invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

Hereinafter, embodiments of the invention will be described in detail with reference to accompanying drawings.

FIG. 1 is a view illustrating a general motion trajectory generation process.

As shown in FIG. 1, in the event that an embedded sensor samples different K poses ($x_k$, $y_k$, k=1, ... K) according to shaking of a camera during an exposure time of the camera, an object point on three dimensional object space is projected on different K locations in two dimensions.

Particularly, an image point on an image plane is related to an object point by a homogeneous vector as shown in following equation 1.

$$[x_k, y_k, 1]^T = \cup_k [X, Y, Z, 1]^T \qquad \text{[Equation 1]}$$

Here, $\cup_k$ indicates a project matrix of kth camera.

If a motion trajectory is generated through a spatially invariant method, K points on the image plane generate a point spread function PSF of corresponding motion blur as following.

$$h(m, n) = \frac{1}{K} \sum_{k=1}^{K} \delta(m - x_k, n - y_k).$$ [Equation 2]

A point spread function h(m,n) for arbitrary coordinate (m, n) is defined as sum of impulse function δ(m−$x_k$, n−$y_k$) shifted by $x_k$ and $y_k$.

In the spatially invariant point spread function, an image degradation model of the motion blur is shown with vector-matrix type as following.

g=Hf+η, [Equation 3]

Here, g means a motion blurred image, H indicates a degradation matrix, f means an ideal image in which the motion blur does not occur, and η indicates an additive noise.

In the event that size of the image corresponds to N×N, g, f and η are expressed as $N^2$×1 lexicographically order vector, and H indicates a block circulant matrix of $N^2$×$N^2$ defined by the point spread function.

A method of the present embodiment analyzes a motion trajectory and calculates a project matrix using an embedded sensor.

To estimate the point spread function of motion, points of each of scenes are projected on an image plane according to the project matrix.

Hereinafter, a process of estimating the point spread function using motion tracking of a camera will be described.

Only relative location of the camera is required for estimating size and shape of the point spread function of the motion.

This is because the point spread function equals to total sum of intensities reflected from first location of motion of the camera to final location of the motion of the camera as shown in equation 2.

Location of respective cameras is projected on the image plane and may be expressed by using planar homography as following.

$$(x_k, y_k, 1)^T = \left[ C \left( R_k + \frac{1}{d} t_k n_v^T \right) C^{-1} \right] (x_0, y_0, 1)^T$$ [Equation 4]

Here, C means an intrinsic matrix of the camera, R indicates a rotation matrix, d means scene depth, t indicates a translation vector, and n, means a normal vector on the image plane.

Figure 2:
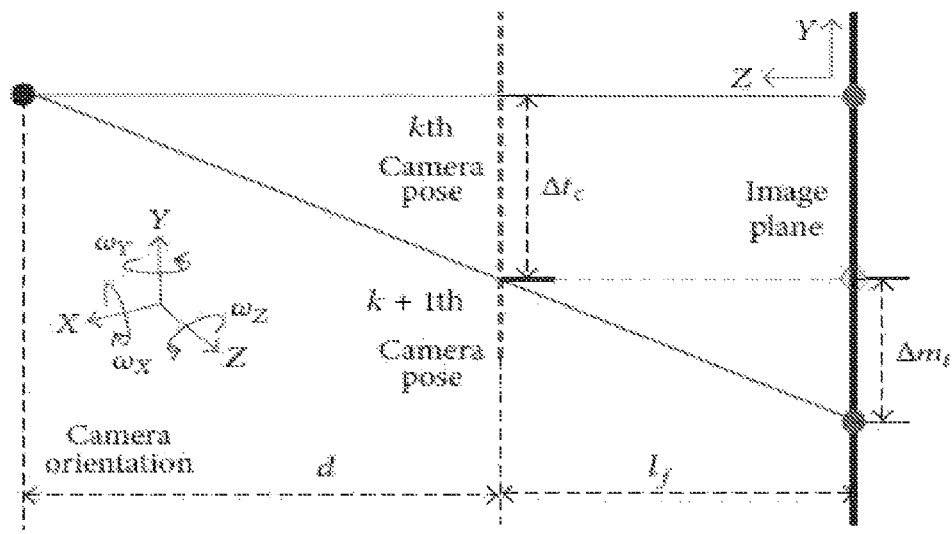
FIG. 2 is a view illustrating motion trajectory according to camera motion.

Relation between motion trajectory and camera translation is shown in FIG. 2, and motion trajectory $\Delta m_t$ on the image plane is calculated by equation 5.

$$\Delta m_t = \frac{l_f}{d} \Delta t_c$$ [Equation 5]

Here, $l_f$ and $\Delta t_c$ indicate focal length and the camera translation, respectively.

If the scene depth is adequately higher than focus distance, the motion trajectory may be neglected. Accordingly, the camera translation does not affect to the point spread function of the motion under the condition that the scene depth is great. As a result, equation 4 is simplified as follows.

$$(x_k, y_k, 1)^T = [CR_tC^{-1}](x_0, y_0, 1)^T$$ [Equation 6]

It is assumed that camera coordinate is arrayed on global coordinate located on an optical axis of the camera.

The camera matrix C is determined by the focus distance as shown in below under the above assumption.

$$C = \begin{bmatrix} l_f & 0 & 0 \\ 0 & l_f & 0 \\ 0 & 0 & 1 \end{bmatrix}$$ [Equation 7]

A rotation matrix is calculated through following equation 8 by using small-angle approximation and a spatially invariant motion blur.

$$R = \begin{bmatrix} 1 & 0 & \omega_i^y \\ 0 & 1 & -\omega_i^x \\ -\omega_i^y & \omega_i^x & 1 \end{bmatrix}$$ [Equation 8]

Here, $\omega_i^x$ and $\omega_i^y$ mean ith angular velocity surrounding x axis and y axis.

Since $l_f \tan(\omega) \approx l_f \omega$ in the event of small ω, the project matrix may be expressed with following equation 9.

$$(x_k, y_k, 1)^T = \begin{bmatrix} 1 & 0 & l_f \omega_i^y \\ 0 & 1 & l_f \omega_i^x \\ 0 & 0 & 1 \end{bmatrix} (x_0, y_0, 1)^T$$ [Equation 9]

Figure 3:
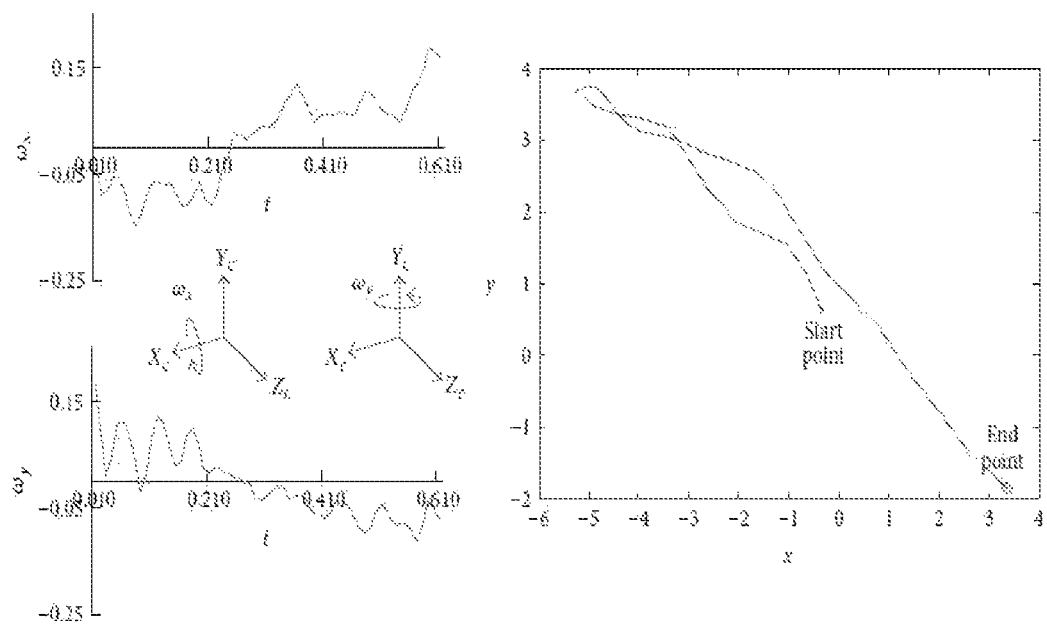
FIG. 3 is a view illustrating gyro data and projected trajectory.

In one embodiment, the method uses gyro data so as to estimate angular velocity according to camera motion as shown in FIG. 3, and calculates corresponding projected location (project trajectory) on the image plane.

Under ideal condition, the projected trajectory is identical to the point spread function of the camera motion.

However, the gyro data includes noise in real environment. Particularly, the gyro data including the noise brings out mismatching between the location projected on the image plane and real point spread function sample.

To perform robust estimation of the point spread function using the gyro data including the noise, it is assumed that the projected trajectory follows Gaussian distribution in the invention.

As a result, the projected trajectory corresponds to sum of the Gaussian distribution.

$$h(m, n) = \frac{1}{K_G} \sum_{k=1}^{K} G(m - x_k, n - y_k)$$ [Equation 10]

Figure 4A:
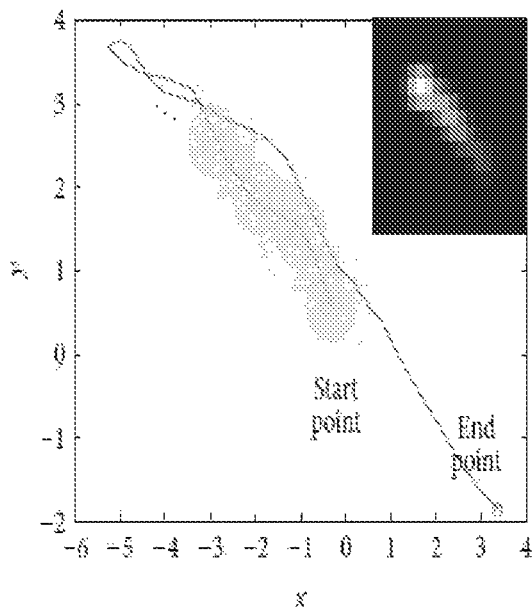
FIG. 4(a) and FIG. 4(b) are a view illustration a process of estimating a point spread function of motion.

As shown in FIG. 4(a), the point spread function of the camera motion corresponds to accumulation of trajectory reweighted by using the Gaussian distribution.

Figure 4B:
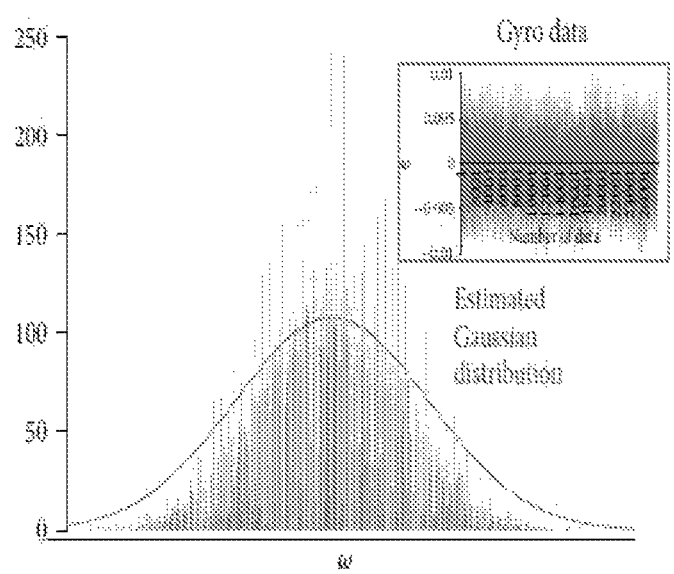

As shown in FIG. 4(b), the Gaussian distribution is estimated by analysis of gyro data of a fixed camera.

The method of the invention uses a sensor data logger provided in C. Jia and B. Evans, "Probabilistic 3-D motion estimation for rolling shutter video rectification from visual and inertial measurements," in Proceedings of the IEEE 14th International Workshop on Multimedia Signal Processing (MMSP '12), pp. 203-208, September 2012, so as to obtain gyro data synchronized with a blur frame.

The gyro data and corresponding blurred frame is time-stamped, and opening and closing of a shutter are recorded in order to analyze delay.

Hereinafter, a process of restoring an image through a spatially adaptive (variant) method by using local statistics will be described.

If the point spread function of the motion is estimated, shaking of the motion is solved through a simple process of restoring the image.

Recently, many methods of restoring the image have been provided so as to remove various types of degradation parameter of the image. Since the restoration of the image corresponds to bad condition problem, standardized solution requires occasionally complex calculation.

To remove the motion blur without artifact not desired, the method of restoring the image according to the present embodiment is expressed by using local statistics for minimizing an energy function defined as following equation 11.

$$E(f) = \frac{1}{2}\|Hf - g\|_2^2 + \frac{\lambda_1}{2}\sum_{i=1}^{2}\|D_i f\|_2^2 + W_m \cdot \left(\frac{\lambda_2}{2}\sum_{i=1}^{2}\|D_i f - D_i C g\|_2^2\right)$$ [Equation 11]

Here, $\|\cdot\|$ means an Euclidean norm, "$\circ$" indicates an element-wise multiplication operator, $W_m$ means a spatially variant activity map, C indicates a high pass filter, $\lambda_1$, $\lambda_2$ mean respectively a horizontal regularization parameter and a vertical regularization parameter, and D1 and D2 indicate a horizontal differential operator and a vertical differential operator, respectively.

If estimated f has artifact such as ringing or noise amplification, $D_i f$ has sharp transition, and so $\|Df - D_i C_g\|$ increases.

Solution of minimization problem is obtained by solving an equation that differential in equation 11 makes 0 as shown in below.

$$Tf - b = 0$$ [Equation 12]

$$T = H^T H + \lambda_1 \left(\sum_{i=1}^{2} D_i^T D_i\right) + \lambda_2 W_m \cdot \left(\sum_{i=1}^{2} D_i^T D_i\right)$$ [Equation 13]

$$b = \left(H^T + \lambda_2 W_m \cdot \left(\sum_{i=1}^{2} D_i^T D_i\right) C\right) g$$ [Equation 14]

Ringing artifact is shown at an edge or nearby of a boundary, and thus the spatially adaptive activity map is used to remove the ringing artifact while the edge is maintained.

$$W_m(x, y) = \frac{1}{p_t \sigma_l^2(x, y) + 1}$$ [Equation 15]

Here, $\sigma_l^2$ means a local variance near (x,y) in an input image, and $p_t$ indicates a parameter adjustable so that the activity map is distributed at [0,1] as far as possible.

In the present embodiment, $p_t$=1500, at which most excellent performance is realized about 5×5 block for the local variance, is empirically used.

A matrix T corresponds to block-circulant for the spatially invariant point spread function of the motion as shown in equation 13, and thus a linear formula in equation 12 may be solved by using a two-dimensional discrete fourier transform.

Here, and $\tilde{f}$, $\tilde{g}$, $\tilde{h}$, $\tilde{d}$ $\tilde{\omega}_m$ and $\tilde{c}$ indicate an estimated image, a measurement image, the point spread function, a differential filter, the activity map and discrete fourier transforms of the high pass filter, respectively. Accordingly, the restoring problem is as follows.

$$\tilde{f}(k, l) = \frac{\left(\tilde{h}^*(k, l) + \lambda_2 \tilde{w}_m(k, l)\sum_{i=1}^{2}|\tilde{d}_i(k, l)|^2 \tilde{c}(k, l)\right)}{|\tilde{h}(k, l)|^2 + \lambda_1 \sum_{i=1}^{2}|\tilde{d}_i(k, l)|^2 + \lambda_2 \tilde{w}_m(k, l)\sum_{i=1}^{2}|\tilde{d}_i(k, l)|^2}$$ [Equation 16]

Here, a restore image $\hat{f}$ is an inverse discrete fourier transform.

On the other hand, the technical features described above can be implemented in the form of program instructions that may be performed using various computer means and can be recorded in a computer-readable medium.

The apparatus for restoring the motion blurred image of the invention may include a processor and a memory.

The processor may include a central processing unit CPU executable a computer program and a virtual machine, etc.

The memory may include a non-volatile storage device such as a fixed hard driver or a detachable storage device. The detachable storage device may have a compact flash unit, an USB memory stick, etc. The memory may include a volatile memory such as various random access memories.

The memory stores program instructions executable by the processor.

The program instructions recorded on the memory can be designed and configured specifically for the present invention or can be a type of medium known to and used by the skilled person in the field of software. Examples of the program of instructions may include not only machine language codes produced by a compiler but also high-level language codes that can be executed by a computer through the use of an interpreter, etc.

The hardware mentioned above can be made to operate as one or more software modules that perform the actions of the embodiments of the invention, and vice versa.

The embodiments of the invention described above are disclosed only for illustrative purposes. A person having ordinary skill in the art would be able to make various modifications, alterations, and additions without departing from the spirit and scope of the invention, but it is to be appreciated that such modifications, alterations, and additions are encompassed by the scope of claims set forth below.

The invention claimed is:

1. A method of restoring a motion blurred image, the method performed by an imaging apparatus, said imaging apparatus comprising a processor, an embedded sensor, and a memory configured to store the motion blurred image, the method comprising:

calculating a motion trajectory and a project trajectory of the imaging apparatus using data sensed by the embedded sensor;

estimating a point spread function according to a motion of the imaging apparatus by using the calculated motion trajectory and project trajectory; and restoring the motion blurred image using the estimated point spread function and a spatially variant activity map, wherein the restoring comprises removing motion blur without an artifact by using local statistics for minimizing an energy function, and wherein the energy function is defined by using the motion blurred image, a degradation matrix, an ideal image in which the motion blur does not occur, the spatially variant activity map, a high pass filter, a horizontal regularization parameter, a vertical regularization parameter, a horizontal differential operator and a vertical differential operator.

2. The method of claim 1, wherein the sensed data sensed is gyro data for estimating angular velocity according to shaking of the imaging apparatus, and the calculated project trajectory follows a Gaussian distribution.

3. The method of claim 2, wherein the point spread function is defined as accumulation of trajectory reweighted by using the Gaussian distribution.

4. The method of claim 1, wherein the spatially variant activity map is used for removing a ringing artifact while an edge is maintained in the motion blurred image.

5. An imaging apparatus for restoring a motion blurred image comprising:

a processor;

a memory connected to the processor; and an embedded sensor connected to the processor, wherein the memory stores program instructions executable by the processor, wherein the processor is configured to calculate a motion trajectory and a project trajectory of the imaging apparatus using data sensed by the embedded sensor, estimate a point spread function according to a motion of the imaging apparatus by using the calculated motion trajectory and project trajectory, and restore the motion blurred image using the estimated point spread function and a spatially variant activity map, wherein a motion blur of the motion blurred image is removed without an artifact by using local statistics for minimizing an energy function, and wherein the energy function is defined by using the motion blurred image, a degradation matrix, an ideal image in which the motion blur does not occur, the spatially variant activity map, a high pass filter, a horizontal regularization parameter, a vertical regularization parameter, a horizontal differential operator and a vertical differential operator.

* * * * *